(12) United States Patent
Schedelbeck et al.

(10) Patent No.: US 12,199,744 B2
(45) Date of Patent: Jan. 14, 2025

(54) PHYSICAL MEDIUM DEPENDENT (PMD) MODULE WITH BURST PREDICTION

(71) Applicant: MAXLINEAR, INC., Carlsbad, CA (US)

(72) Inventors: Gert Schedelbeck, Munich (DE); Thomas Heuken, Neufahrn (DE); Franz Josef Schäfer, Oberhaching (DE); Rainer Strobel, Munich (DE)

(73) Assignee: MAXLINEAR, INC., Carlsbad, CA (US)

( * ) Notice: Subject to any disclaimer, the term of this patent is extended or adjusted under 35 U.S.C. 154(b) by 46 days.

(21) Appl. No.: 18/055,148

(22) Filed: Nov. 14, 2022

(65) Prior Publication Data

US 2023/0155714 A1    May 18, 2023

Related U.S. Application Data

(60) Provisional application No. 63/264,014, filed on Nov. 12, 2021.

(51) Int. Cl.
*H04J 14/00* (2006.01)
*H04J 14/02* (2006.01)
*H04Q 11/00* (2006.01)

(52) U.S. Cl.
CPC ...... *H04J 14/0235* (2013.01); *H04Q 11/0067* (2013.01)

(58) Field of Classification Search
CPC ............. H04J 14/0235; H04J 14/0238; H04J 14/0249; H04J 14/0245; H04J 14/0246; H04J 14/02; H04J 14/0216; H04B 10/27; H04B 10/2507; H04B 10/0795; H04B 10/40; H04Q 11/0067

USPC .... 398/66, 67, 68, 69, 70, 71, 72, 100, 158, 398/159, 33, 38, 79, 45, 48, 135, 136, 25, 398/26, 27, 202, 208, 209, 75

See application file for complete search history.

(56) References Cited

U.S. PATENT DOCUMENTS

| | | | |
|---|---|---|---|
| 10,056,975 B2 * | 8/2018 | Soto | H04J 14/0282 |
| 2008/0253777 A1 * | 10/2008 | Delve | H04L 25/03019 398/208 |
| 2015/0288456 A1 * | 10/2015 | Zhu | H04B 10/272 398/68 |
| 2018/0316456 A1 | 11/2018 | Tebbe | |
| 2021/0006334 A1 | 1/2021 | Yoshino | |

OTHER PUBLICATIONS

IEEE 802.3-2018, IEEE Standard for Ethernet.
ITU-T supplement G.sup48: "10-Gigabit-capable passive optical networks: Interface between media access control with serializer/deserializer and physical medium dependent sublayers", Supplement 48, (Jun. 2010).
SFP+: SFF-8418 "Specification for SFP+ 10 Gb/s Electrical Interface", SFF Committee, Rev 1.4, Jul. 30, 2015.

(Continued)

*Primary Examiner* — Hanh Phan
(74) *Attorney, Agent, or Firm* — Buchalter; Jason W. Croft

(57) ABSTRACT

A method includes obtaining information about a next upstream burst transmission. The method also includes determining a set of settings based on the information. The method includes adjusting a physical medium dependent (PMD) module based on the set of settings prior to receiving the next upstream burst transmission.

26 Claims, 10 Drawing Sheets

(56) References Cited

OTHER PUBLICATIONS

XFP: INF-8077i 10 Gigabit Small Form Factor Pluggable Module SFF Committee, Revision 4.5, Aug. 31, 2005.
IEEE P802.3ca™—Physical Layer Specifications and Management Parameters for 25 Gb/s and 50 Gb/s Passive Optical Networks, Published Date:Jul. 3, 2020.
ITU-T Recommendation G.9804.3—50-Gigabit-Capable Passive Optical Networks (50G-PON): Physical Media Dependent Layer Specification, 2021.
ITU-T Contribution SG15-C-2255: "G.HSP: Equalizers and Receiver Architectures", Geneva, Sep. 7-18, 2020.
Mueller et al. "Cyclic equalization—A New Rapidly Converging Equalization Techniquie for Synchronous Data Communication", Bell System Technical Journal: Feb. 1975.
International Search Report and Written Opinion in PCT/US2022/079801 mailed Feb. 14, 2023.
International Preliminary Report on Patentability for PCT/US2022/079801 mailed May 23, 2024.

\* cited by examiner

PHYSICAL MEDIUM DEPENDENT (PMD) MODULE WITH BURST PREDICTION

CROSS REFERENCE TO RELATED APPLICATIONS

This U.S. patent application claims priority to Provisional Patent Application 63/264,014 filed on Nov. 12, 2021. The disclosure of this prior application is considered part of the disclosure of this application and is hereby incorporated by reference in its entirety.

TECHNICAL FIELD

This disclosure relates to a physical medium dependent (PMD) module and a transmission control (TC-MAC) module that are associated with a transceiver of an optical line terminal in a passive optical network (PON).

BACKGROUND

Unless otherwise indicated herein, the materials described herein are not prior art to the claims in the present application and are not admitted to be prior art by inclusion in this section.

A passive optical network (PON) may include an optical line terminal (OLT) that may be connected to one or more optical network units (ONUs). The OLT may include a transceiver configured with a physical media dependent (PMD) module and a transmission control (TC-MAC) module. Likewise, each of the ONUs may include a transceiver configured with a PMD module and a TC-MAC module.

Transmissions from the OLT to the one or more ONUs may include a continuous broadcast that may be received by all ONUs included in the PON. Transmissions from the one or more ONUs to the OLT may be organized in bursts, where one ONU is allowed to transmit at a pre-allocated time slot or time window to prevent overlapping of optical signals (i.e., collisions).

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

One aspect of the disclosure provides a method for receiving an upstream burst transmission. The method includes obtaining, by one or more processors, information about a next upstream burst transmission. The method also includes determining, by the one or more processors, a set of settings based on the information. The method further includes adjusting, by the one or more processors, a physical medium dependent (PMD) module based on the set of settings prior to receiving the next upstream burst transmission by the PMD module.

Implementations of the disclosure may include one or more of the following optional features. In some implementations, the PMD module is configured to derive the information about the next upstream burst transmission. In some implementations, a transmission control (TC-MAC) module in communication with the PMD module is configured to derive the information about the next upstream burst transmission. In some implementations, the information includes at least one of: starting time of the next upstream burst transmission, length of the next upstream burst transmission, optical network unit (ONU) transmitting the next upstream burst transmission, an ending time of the next upstream burst transmission, or information related to performing a reset of settings. In some implementations, the set of settings includes at least one of: an equalizer coefficient associated with the ONU, a phase locked loop (PLL) setting associated with the ONU, an analog gain control (AGC) setting associated with the ONU, a direct current (DC) offset setting associated with the ONU, a data rate, or a symbol rate.

In some implementations, the method includes obtaining the information includes monitoring, by the one or more processors, downstream data and analyzing, by the one or more processors, a framing sublayer (FS) frame in the downstream data. In some implementations, the method includes analyzing, by the one or more processors, first data in a bandwidth map field in the FS frame and analyzing, by the one or more processors, second data in a physical layer operations management maintenance, downstream (PLOAMd) field in the FS frame. In some implementations, the first data in the bandwidth map field includes an allocation identifier (AllocID) associated with the next upstream burst transmission. In some implementations, the method includes determining, by the one or more processors, an ONU transmitting the next upstream burst transmission based on the allocation identifier (AllocID) in the first data and allocation identifier (AllocID)-to-ONU relationship information in the second data. In some implementations, the set of settings is associated with the ONU. In some implementations, the method includes allocating a setting register for a new ONU, detecting a message from the new ONU during a quiet window, and associating the allocated setting register with the new ONU. In some implementations, the message includes a serial number of the new ONU. In some implementations, obtaining the information includes obtaining the information from a TC-MAC module in communication with the PMD module.

Another aspect of the disclosure provides a system that includes data processing hardware (e.g., one or more processors) and memory hardware in communication with the data processing hardware. The memory hardware stores instructions that when executed on the data processing hardware cause the data processing hardware to perform operations. The operations include obtaining information about a next upstream burst transmission. The operations also include determining a set of settings based on the information. The operations further include adjusting a PMD module based on the set of settings prior to receiving the next upstream burst transmission by the PMD module.

Implementations of the disclosure may include one or more of the following optional features. In some implementations, the PMD module is configured to derive the information about the next upstream burst transmission. In some implementations, a TC-MAC module in communication with the PMD module is configured to derive the information about the next upstream burst transmission. In some implementations, the information includes starting time of the next upstream burst transmission, length of the next upstream burst transmission, ONU transmitting the next upstream burst transmission an ending time of the next upstream burst transmission, or information related to performing a reset of settings. In some implementations, the set of settings includes at least one of: an equalizer coefficient associated with the ONU, a phase locked loop (PLL) setting associated with the ONU, an analog gain control (AGC)

setting associated with the ONU, a direct current (DC) offset setting associated with the ONU, a data rate, or a symbol rate, etc.

In some implementations, obtaining the information includes monitoring downstream data and analyzing a FS frame in the downstream data. In some implementations, the operations include analyzing first data in a bandwidth map field in the FS frame and analyzing second data in a physical layer operations management maintenance, downstream (PLOAMd) field in the FS frame. In some implementations, the first data in the bandwidth map field includes an allocation identifier (AllocID) associated with the next upstream burst transmission. In some implementations, the operations include determining an ONU transmitting the next upstream burst transmission based on the allocation identifier (AllocID) in the first data and allocation identifier (AllocID)-to-ONU relationship information in the second data. In some implementations, the set of settings is associated with the ONU. In some implementations, the operations include allocating a setting register for a new ONU, detecting a message from the new ONU during a quiet window, and associating the allocated setting register with the new ONU. In some implementations, the message includes a serial number of the new ONU. In some implementations, obtaining the information includes obtaining the information from a TC-MAC module in communication with the PMD module.

DESCRIPTION OF DRAWINGS

Example implementations will be described and explained with additional specificity and detail through the use of the accompanying drawings in which.

Like reference symbols in the various drawings indicate like elements.

DETAILED DESCRIPTION

Various systems and methods for tuning or adjusting an optical line terminal (OLT) (e.g., components/sub-components in a physical medium dependent (PMD) module of the OLT) for each upstream burst transmission prior to receiving each upstream burst transmission are described in this disclosure. By pre-configuring the OLT before receiving each of the upstream burst transmissions, the OLT is able to operate with a shorter preamble that allows less overhead and greater upstream data rates, especially for latency sensitive traffic (e.g., short burst transmissions).

Based on information about the next upstream burst transmission, components/sub-components in the PMD module can be adjusted or tuned accordingly prior to receiving the next upstream burst transmission. In some implementations, the PMD module derives or determines the information about the next burst transmission with information from a transmission control (TC-MAC) module. In some implementations, the PMD module derives or determines the information about the next burst transmission without information from the TC-MAC module.

Figure 1:
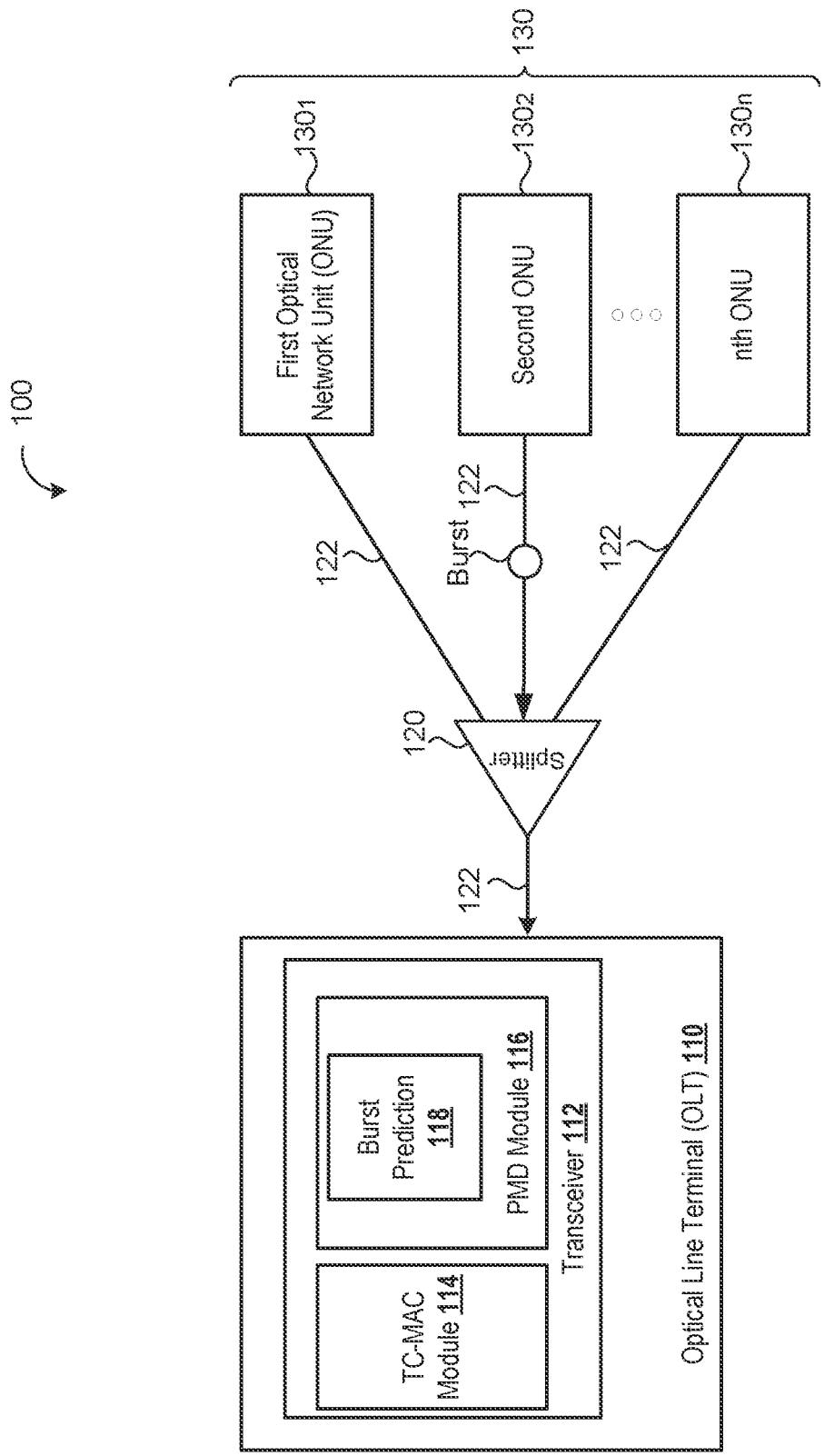
FIG. 1 is a simplified schematic view of an example passive optical network (PON) including an optical line terminal (OLT) and a plurality of optical network units (ONUs) in accordance with some implementations of this disclosure.

FIG. 1 is a simplified schematic view of an example passive optical network (PON) 100 including an OLT 110 and a plurality of optical network units (ONUs) 130 in accordance with some implementations of this disclosure.

As shown, in some implementations, each of the ONUs 130 is connected to the splitter 120 using a different optical fiber line 122, and the OLT 110 is connected to the splitter 120 using an optical fiber line 122. As result, each of the ONUs 130 in the PON 100 is in communication with the OLT 110. Since each of the ONUs 130 is connected to the OLT 110 using different paths (e.g., optical fiber lines 122 with different lengths), each optical signal (e.g., burst transmission) from the ONUs 130 arrives at the OLT 110 in a different condition (e.g., attenuations, characteristic features).

As shown, in some implementations, the OLT 110 includes a burst prediction component 118. The burst prediction component 118 may be configured to predict or to determine a next upstream burst transmission from any ONUs 130 included in the PON 100 (e.g., next upstream burst transmission time, next upstream burst transmission length, ONU transmitting the next upstream burst transmission). In some implementations, the burst prediction component 118 is configured to adjust settings within one or more components of the OLT 110 (e.g., components/sub-components of the PMD module 116) which may place the OLT 110 in an improved condition (e.g., per-configured PMD module 116 so it is tuned to work with an optical signal (e.g., optical signal with a certain attenuation) from the ONU 130 that transmits the next upstream burst transmission) to receive and process the upstream burst transmission prior to receiving the burst transmission. Additional details related to the burst prediction component 118 of the OLT 110 may be discussed in more depth in other portions of this disclosure and/or the figures.

As shown, in some implementations, the OLT 110 includes a transceiver 112 configured with a TC-MAC module 114 and a PMD module 116 in communication with the TC-MAC module 114. As shown, in some implementations, the PMD module 116 (also referred as PMD layer) and the TC-MAC module 114 (also referred as TC layer) may be implemented in separate devices. For example, the TC-MAC module 114 may be implemented as part of a host system on a chip (SoC) or an application specific integrated circuit (ASIC) and the PMD module 116 may be included in a module separate from the host system SoC/ASIC. In some implementations, the PMD module 116 is configured to perform a conversion between optical signals and electrical signals and the TC-MAC module 114 is configured to perform error correction coding and/or error correction decoding.

As shown, in some implementations, the burst prediction component 118 is associated with and/or a part of the PMD module 116. In some implementations, the burst prediction component 118 is associated with and/or a part of the TC-MAC module 114. In some implementations, the burst prediction component 118 includes a first burst prediction component 118$_1$ (shown in FIG. 4) associated with and/or a part of the TC-MAC module 114 and a second burst prediction component 118$_2$ (shown in FIG. 4) associated with and/or a part of the PMD module 116.

Figure 2:
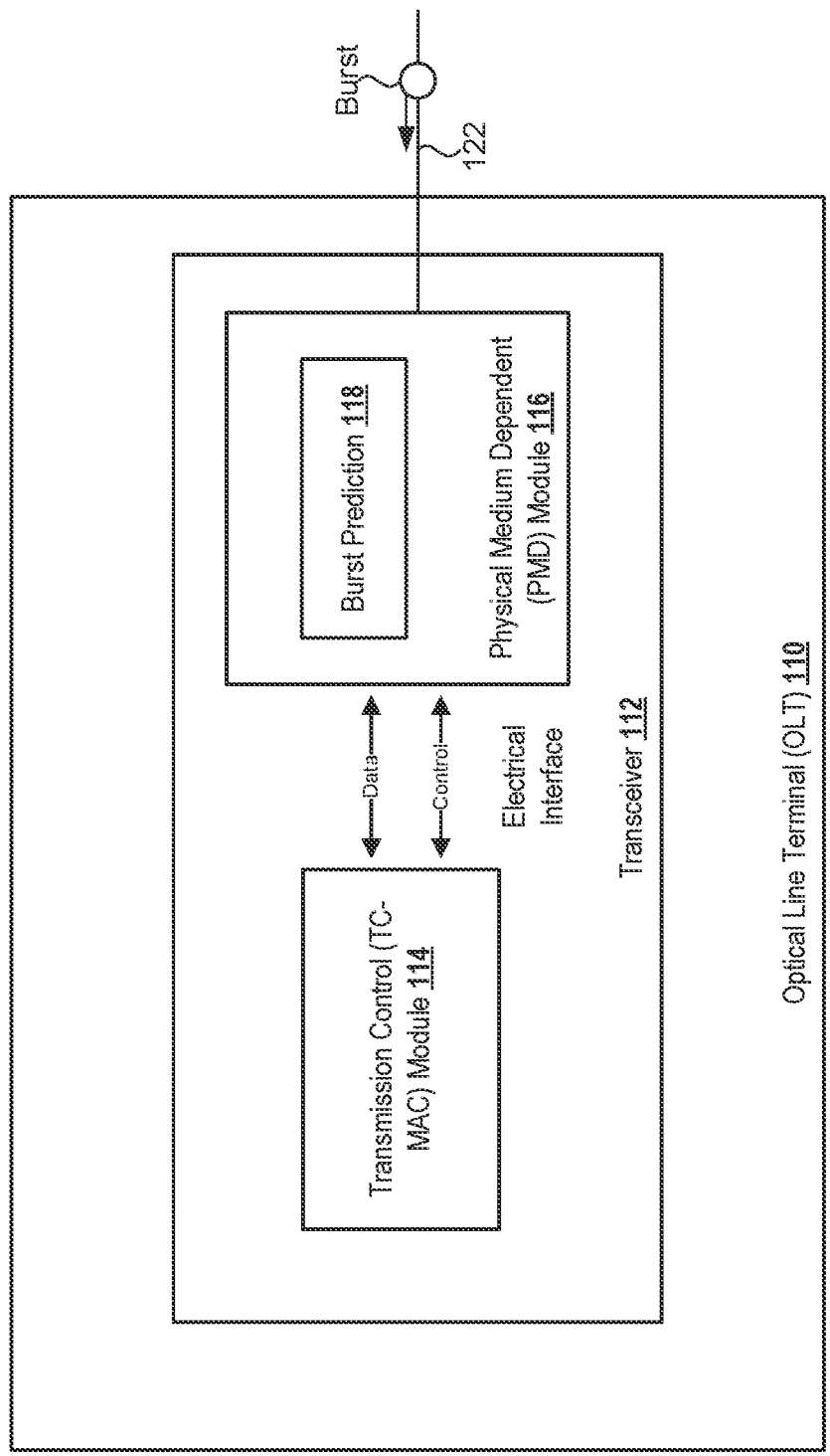
FIG. 2 illustrates an example transceiver (of an OLT) including a physical medium dependent (PMD) module 116 and a transmission control (TC-MAC) module in communication with the PMD module via an electrical interface (e.g., electrical connections) in accordance with some implementations of this disclosure.

FIG. 2 illustrates an example transceiver 112 (of an OLT 110) including a PMD module 116 and a TC-MAC module 114 in communication with the PMD module 116 via an electrical interface (e.g., electrical connections) in accordance with some implementations of this disclosure.

In some implementations, the PMD module 116 is configured to perform conversions between optical signals and electrical signals and the TC-MAC module 114 is configured to perform error correction coding and/or error decoding.

As shown, in some implementations, the PMD module 116 includes a burst prediction component 118 that contributes to configuring the transceiver 112 (e.g., PMD module 116) for future upstream bursts. As show, in some implementations, the TC-MAC module 114 and the PMD module 116 are electrically coupled such that electrical signals may pass between the TC-MAC module 114 and the PMD module 116. The electrical interface between the TC-MAC module 114 and the PMD module 116 may facilitate the transmission of various signals between TC-MAC module 114 and the PMD module 116. For example, control signals and/or data may be transmitted between the TC-MAC module 114 and the PMD module 116 via the electrical interface.

In some implementations, the transceiver 112 (e.g., PMD module 116) is configurable so that settings associated with receiving upstream burst transmissions can be adjusted before receiving the upstream transmissions from optical network units (OUNs) 130. For example, the transceiver 112 (e.g., PMD module 116) is configured with a first combination of settings for an upstream burst transmission from a first ONU 130$_1$ when the upstream burst transmission from the first ONU 130$_1$ is expected. Similarly, the transceiver 112 (e.g., PMD module 116) is configured with a second combination of settings (different from the first combination of settings) for an upstream burst transmission from a second ONU 130$_2$ when the upstream burst transmission from the second ONU 130$_2$ is expected. In other words, the transceiver 112 is configurable so it can handle (e.g., receiving, processing) each upstream burst transmission from different optical network units (OUNs) 130.

In some circumstances, the settings associated with receiving upstream burst transmission (also referred as receiver settings) may include phase locked loop (PLL) settings, analog gain control (AGC) settings, direct current (DC) offset for offset compensation, and/or other receiver settings. The phase locked loop (PLL) settings may include signal phase and signal frequency associated with the received signal (e.g., upstream burst transmission). In instances in which the upstream burst transmission includes a high data rate (e.g., 10 Gbit/s or greater), the transceiver 112 of the OLT 110 may include adaptive settings, in addition to the receiver settings, which may include receive equalizer settings (e.g., equalizer coefficients), receive forward error correction (FEC) settings, and/or other high data rate settings. In some implementations, one or more parameters of the transceiver 112 of the OLT 110 (also referred as OLT receiver) may be tuned by adjusting the receiver settings and/or the adaptive settings. For example, a signal-to-noise ratio, a bit error rate, and/or other OLT receiver parameters may be tuned by making adjustments to the receiver settings and/or the adaptive settings.

Figure 3:
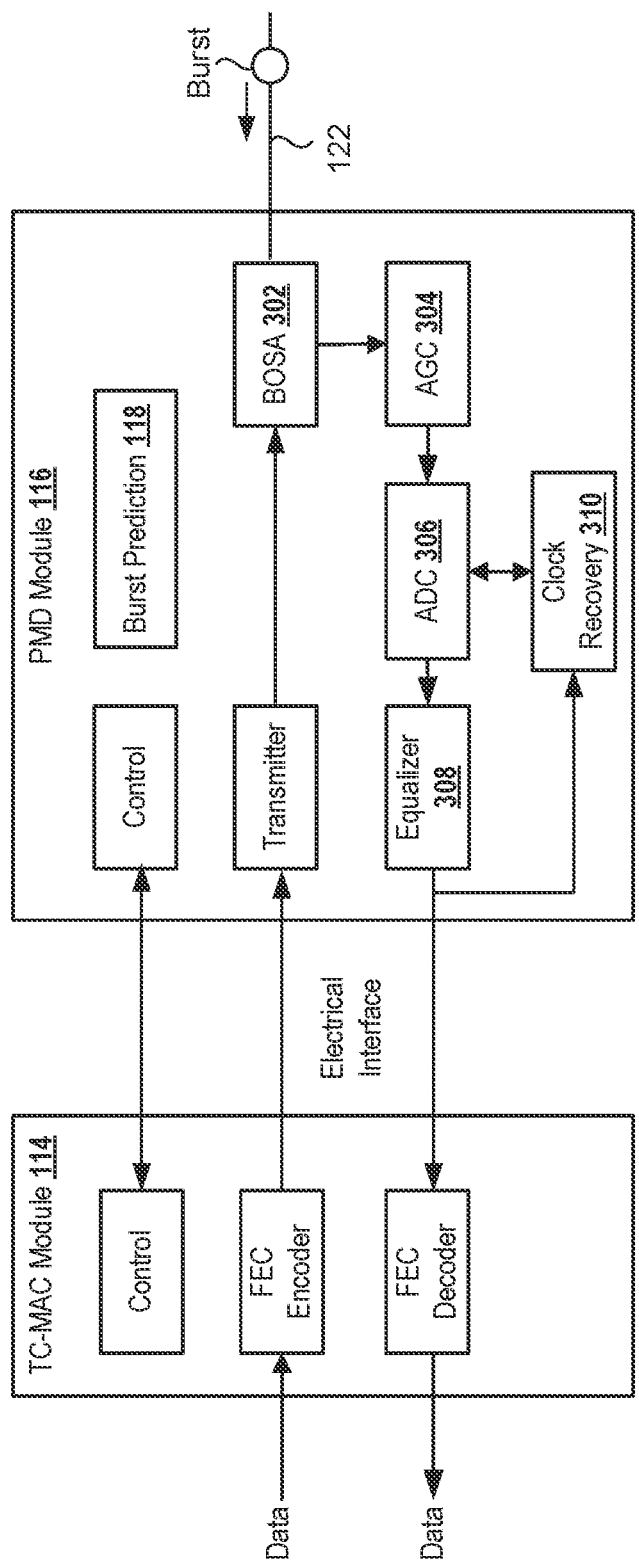
FIG. 3 is a simplified schematic view of a PMD module and a TC-MAC module that are associated with a transceiver of an OLT in accordance with some implementations of this disclosure.

FIG. 3 is a simplified schematic view of a PMD module 116 and a TC-MAC module 114 that are associated with a transceiver 112 of an OLT 110 in accordance with some implementations of this disclosure.

As shown, in some implementations, the PMD module 116 includes one or more components/sub-components, any of which may be adjusted and/or tuned with receiver settings and/or adaptive settings configured for each transmitting ONU 130. For example, the burst prediction component 118 may be configured to adjust and/or tune one or more of the receiver settings and adaptive settings for each upstream burst prior to the PMD module 116 receiving the upstream burst transmission. In other words, the burst prediction component 118 may be configured to adjust and/or tune the receiver settings and/or the adaptive settings of components/sub-components of PMD module 116.

For example, when a burst transmission from the first ONU 130$_1$ is expected, the burst prediction component 118 may be configured to adjust and/or tune: analog gain controller (AGC) 304 with an analog gain control setting for the burst transmission from the first ONU 130$_1$, analog-to-digital converter (ADC) 306 with a direct current (DC) offset for the burst transmission from the first ONU 130$_1$, and equalizer 308 with a receive equalizer setting (e.g., equalizer coefficients) for the burst transmission from the first ONU 130$_1$ prior to receiving the burst transmission from the first ONU 130$_1$. Accordingly, the transceiver 112 is adjusted and/or tuned to receive and process the burst transmission from the first ONU 130$_1$ with a shorter preamble.

In some implementations, the receiver settings and/or adaptive settings may be (fully) trained and/or retrained for each upstream burst transmission (from different ONUs), which may introduce inefficiencies. For example, a PON may employ long preambles in the upstream burst transmission and/or other overhead associated with the preamble for configuring the receiver settings and/or the adaptive settings which may lead to long training times and increased inefficiency in the PON. Also, as the number of adaptive settings increase and/or the demands for bandwidth in the upstream channel increase, a minimum size of preamble that may be used to train the adaptive settings may become excessively long. In some implementations, a fast-converging training algorithm is used to quickly configure the receiver settings and/or adaptive settings in the PON. However, the fast-converging training algorithm may be complex in implementation and/or may include fault tolerances that may contribute to an increased probability of transmission errors.

In some implementations, the trained receiver settings and/or the trained adaptive settings for each ONU 130 or groups of ONUs 130 are stored in the PMD module 116 (e.g., registers in the PMD module 116 shown in FIG. 4) and/or TC-MAC module 114 (e.g., registers in the TC-MAC module 114). The stored settings (i.e., receiver settings, adaptive settings) can be re-used for future communication. As a result, the receiver settings and/or adaptive settings may not need a full re-training. For example, when a burst transmission from the first ONU $130_1$ is expected, the burst prediction component 118 may be configured to adjust and/or tune: analog gain controller (AGC) 304 with an analog gain control setting for the burst transmission from the first ONU $130_1$, analog-to-digital converter (ADC) 306 with a direct current (DC) offset for the burst transmission from the first ONU $130_1$, and equalizer 308 with a receive equalizer setting (e.g., equalizer coefficients) for the burst transmission from the first ONU $130_1$ using the stored settings for the first ONU $130_1$. As the stored settings are based on prior (full) training, the components/sub-components in the PMD module 116 may need a short preamble or no preamble for the re-training to receive and process the burst transmission from the ONU $130_1$. In some implementations, the TC-MAC module 114 keeps track of which optical network unit 130 transmitting the next burst transmission so that the components/sub-components in the transceiver 112 (e.g., PMD module 116) are pre-configured with settings corresponding to the optical network unit 130 transmitting the next burst transmission prior to receiving the next burst. In some implementations, the PMD module 116 keeps track of which optical network unit 130 transmitting the next burst transmission so that the components/sub-components in the transceiver 112 (e.g., PMD module 116) are pre-configured with settings corresponding to the optical network unit 130 transmitting the next burst transmission prior to receiving the burst.

Figure 4:
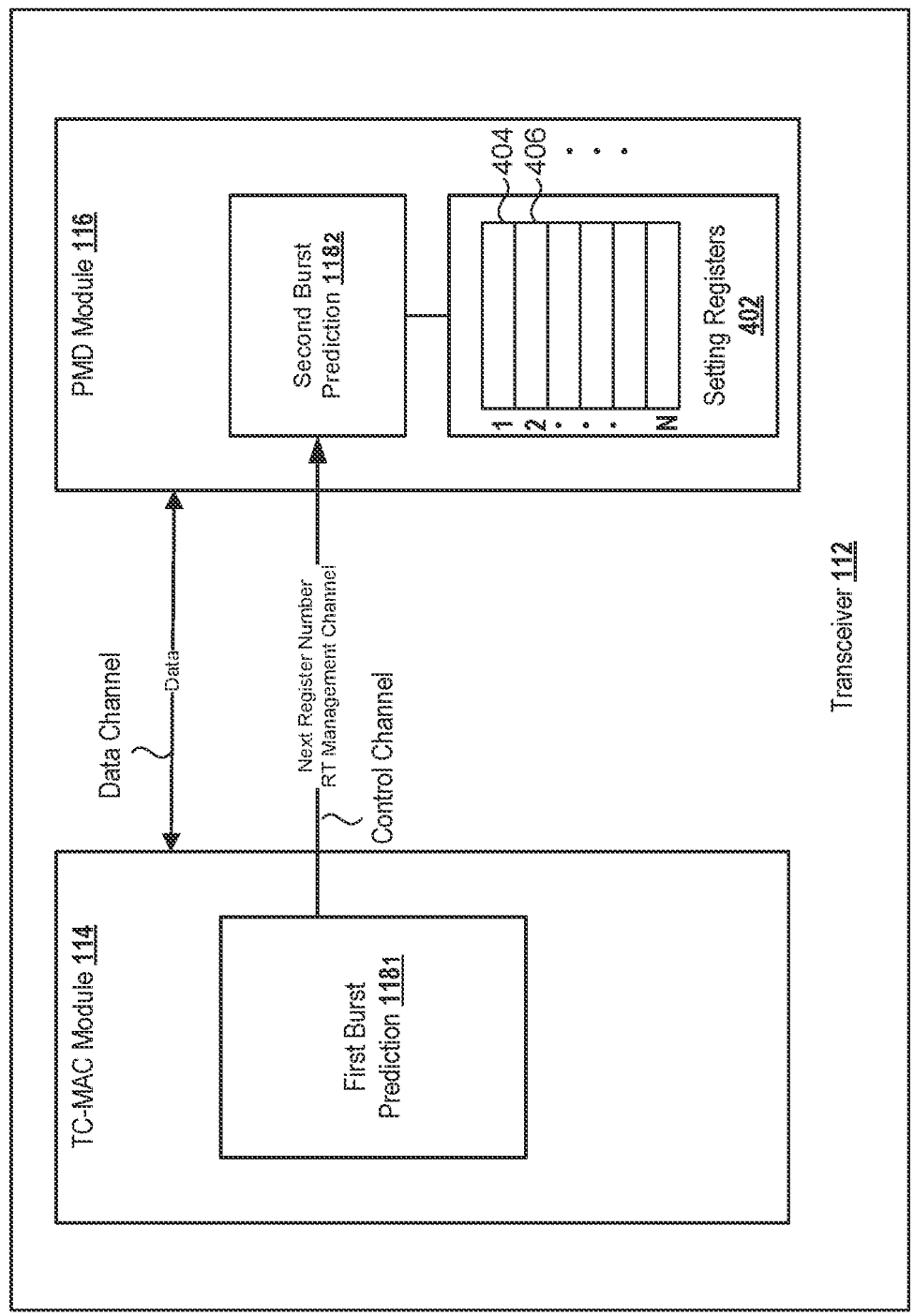
FIG. 4 illustrates an example transceiver (of an OLT) including a PMD module and a TC-MAC module in communication with the PMD module in accordance with some implementations of this disclosure.

FIG. 4 illustrates an example transceiver 112 (of an OLT 110) including a PMD module 116 and a TC-MAC module 114 in communication with the PMD module 116 in accordance with some implementations of this disclosure.

As shown, in some implementations, the TC-MAC module 114 includes a first burst prediction component $118_1$. As shown, in some implementations, the PMD module 116 includes setting registers 402 (i.e., memory or storage for storing settings) (also referred as coefficient registers) and a second burst prediction component $181_2$ in communication with the first burst prediction component $181_1$.

As shown, in some implementations, the first burst prediction component $181_1$ is in communication with the second burst prediction component $181_2$ via one or more connections (e.g., data channel, control channel) between the first burst prediction component $181_1$ and the second burst prediction component $181_2$.

In some implementations, the first burst prediction component $118_1$ is configured to predict (or to keep track of) a next upstream burst transmission from any ONUs 130 included in the PON 100 (e.g., keeping track of next upstream burst transmission time, next upstream burst transmission length, and/or ONU transmitting the next upstream burst transmission). In some implementations, the first burst prediction component $118_1$ is configured to transmit information with respect to the next upstream burst transmission (e.g., next upstream burst transmission time, next upstream burst transmission length, ONU transmitting the next upstream burst transmission) to the PMD module 116 (e.g., second burst prediction component $118_2$).

In some implementations, based on the information from the TC-MAC module 114 (e.g., first burst prediction component $118_1$), the PMD module 116 (e.g., second burst prediction component $118_2$) is configured to adjust settings within one or more components of the transceiver 112 (e.g., components/sub-components of the PMD module 116) which may place the OLT 110 in an improved condition (e.g., per-configured PMD module 116 so it is tuned and ready to work with an optical signal from the ONU 130 that transmits the next upstream burst transmission) to receive and process the upstream burst transmission.

As discussed, in some implementations, the (trained) receiver settings and/or the (trained) adaptive settings (collectively referred as settings) for each ONU 130 or groups of ONUs 130 are stored in the setting registers 402. For instance, the setting registers 402 of the PMD module 116 may include a table (e.g., coefficient table) that may be configured to store settings associated with an upstream burst transmission, which may include equalizer coefficients, direct current blocking, timing offsets, and/or other upstream burst settings. For example, a first setting register 404 of the setting registers 402 includes a first set of settings (e.g., phase locked loop (PLL) settings, analog gain control (AGC) setting, direct current (DC) offset, receive equalizer settings (equalizer coefficients, a data rate, or a symbol rate), receive FEC settings) for the first optical network unit $130_1$ and a second setting register 406 of the setting registers 402 includes a second set of settings (e.g., phase locked loop (PLL) settings, analog gain control (AGC) setting, direct current (DC) offset, receive equalizer settings (equalizer coefficients), receive FEC settings) for the second optical network unit $130_2$.

In some implementations, the PMD module 116 obtains the settings (e.g., receiver settings, adaptive settings) from the TC-MAC module 114. In some implementations, the PMD module 116 obtains the settings (e.g., receiver settings, adaptive settings) from the initial training of all components/sub-components on the full preamble of each individual upstream burst transmission. In some implementations, the settings stored in the setting registers 402 are updated based on subsequent trainings. In some implementations, the subsequent trainings are performed using preambles that are shorter than the preambles used in the initial training.

In some implementations, the first burst prediction $118_1$ of the TC-MAC module 114 is configured to predict (or to keep track of) a next upstream burst transmission from any ONUs 130 included in the PON 100 and to inform the next upstream burst transmission (e.g., next upstream burst transmission time, next upstream burst transmission length, and/or ONU transmitting the next upstream burst transmission) to the PMD module 116 (e.g., second burst prediction component $118_2$).

In some implementations, based on the information (e.g., ONU transmitting the next upstream burst transmission) from the first burst prediction component $118_1$, the second burst prediction component $118_2$ determines a setting register (in the setting registers 402) corresponding to the ONU transmitting the next upstream burst transmission in the information from the TC-MAC module 114 and tunes or adjusts the transceiver 112 (e.g., components/sub-components in the PMD module 116) with a set of settings (e.g., receiver settings and/or the adaptive settings) in the determined setting register. For example, when the first burst prediction component $118_1$ informs the second burst prediction component $118_2$ that the second ONU $130_2$ will transmit the next upstream burst transmission, the second burst prediction component $118_2$ determines a setting register corresponding to the second ONU $130_2$ (setting register 406 in this example) and tunes or adjusts the transceiver 112 (e.g., components/sub-components in the PMD module 116) with a set of settings (e.g., the receiver settings and/or the adaptive settings) in the determined setting register.

In some implementations, based on the information (e.g., next upstream burst transmission time, next upstream burst transmission length, and/or ONU transmitting the next upstream burst transmission) the first burst prediction component $118_1$ keeps track of, the first burst prediction component $118_1$ determines a setting register to be used for the next burst transmission and communicate the setting register to be used for the next burst transmission to the second burst prediction component $118_2$. In response to the communication from the first burst prediction component $118_1$, the second burst prediction component $118_2$ tunes or adjusts or resets the transceiver 112 (e.g., components/sub-components in the PMD module 116) with a set of setting (e.g., receiver settings and/or the adaptive settings) in the determined setting register. For example, the first burst prediction component $118_1$ determines that the second ONU $130_2$ will transmit the next upstream burst transmission, the first burst prediction component $118_1$ determines a setting register corresponding to the second ONU $130_2$ (setting register 406 in this example) and communicate the determined setting register to the second burst prediction component $118_2$. In response to the communication from the first burst prediction component $118_1$, the second burst prediction component $118_2$ tunes or adjusts or resets the transceiver 112 (e.g., components/sub-components in the PMD module 116) with a set of settings (e.g., receiver settings and/or the adaptive settings) in the determined setting register.

In some implementations, based on the information (e.g., next upstream burst transmission time, next upstream burst transmission length, and/or ONU transmitting the next upstream burst transmission) the first burst prediction component $118_1$ keeps track of, the first burst prediction component $118_1$ determines a set of settings (receiver settings and/or the adaptive settings) to be used for the next burst transmission and communicate the set of settings to be used for the next burst transmission to the second burst prediction component $118_2$. In response to the communication from the first burst prediction component $118_1$, the second burst prediction component $118_2$ tunes or adjusts or resets the transceiver 112 (e.g., components/sub-components in the PMD module 116) with the set of settings (e.g., receiver settings and/or the adaptive settings in the setting register received from the first bust prediction component $118_1$. For example, the first burst prediction component $118_1$ determines that the second ONU $130_2$ will transmit the next upstream burst transmission, the first burst prediction component $118_1$ transmits a set of settings predetermined for the second ONU $130_2$ with a next upstream burst transmission time and a next upstream burst transmission length. In response to the communication from the first burst prediction component $118_1$, the second burst prediction component $118_2$ tunes or adjusts the transceiver 112 (e.g., components/sub-components in the PMD module 116) with the set of settings (e.g., receiver settings and/or the adaptive settings) in the set of settings received from the first burst prediction component $118_1$.

Communications between the TC-MAC module 114 and the PMD module 116 may occur in substantially real-time. In some implementations, the TC-MAC module 114 (e.g., first burst prediction component $118_1$) transmits the information (e.g., next upstream burst transmission time, next upstream burst transmission length, ONU transmitting the next upstream burst transmission, setting register to be used, set of settings) to the PMD module 116 (e.g., second burst prediction component $118_2$) over a control transmission line, which may be separate from a data transmission line that may be transmitting the upstream burst. In some implementations, the control transmission line may be separate from the data transmission line but may be used for other control transmission not related to burst prediction.

In some implementations, the TC-MAC module 114 (e.g., first burst prediction component $118_1$) transmits the information (e.g., next upstream burst transmission time, next upstream burst transmission length, ONU transmitting the next upstream burst transmission, setting register to be used, set of settings) to the PMD module 116 (e.g., second burst prediction component $118_2$) over a downstream data channel that may cause an increase in the data rate between the PMD module 116 and the TC-MAC module 114.

In some implementations, the TC-MAC module 114 is configured to transmit the information (e.g., next upstream burst transmission time, next upstream burst transmission length, ONU transmitting the next upstream burst transmission, setting register to be used, set of settings) to the PMD module 116 (e.g., second burst prediction component $118_2$) in-band using the PON overhead channel. For example, the information may be transmitted using addressing information for a TC-MAC module 114 within the OLT 110 to an ONU ID that is not in use (e.g., the ONU ID is not associated with an ONU in the PON). In some implementations, the TC-MAC module 114 has access to the ONU ID of messages directed to the PMD module 116 in the OLT 110 and the TC-MAC module 114 is capable of filtering on the transmitted optical line terminal (ONU) messages using the optical line terminal (ONU) ID. Further, additional optical line terminals (ONUs) in the PON may be unaffected as optical line terminals (ONUs) may not access control messages intended for a different optical line terminal (ONU).

Figure 5:
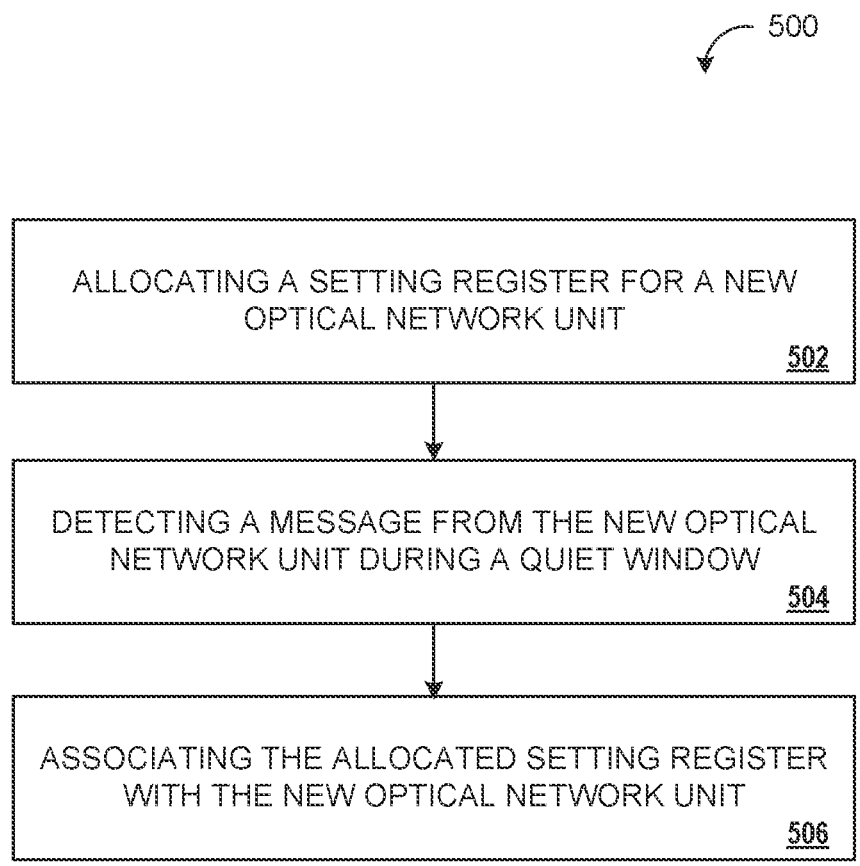
FIG. 5 is a flowchart of an example arrangement of operations for a method of updating a setting registers in the PMD module in accordance with some implementations of this disclosure.

FIG. 5 is a flowchart of an example arrangement of operations for a method 500 of updating a setting registers 402 (also referred as coefficients registers) in the PMD module 116 in accordance with some implementations of this disclosure.

The method 500 may be performed by processing logic that may include hardware (circuitry, dedicated logic, etc.), software (such as is run on a general purpose computer system or a dedicated machine), or a combination of both, which processing logic may be included in any computer system or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method, at operation 502, includes allocating, by the TC-MAC module 114, a setting register (also referred as coefficient register) in the setting registers 402 for a new ONU 130. In some implementations, when there is no available (un-used) setting register in the setting registers 402 to allocate to a new ONU 130, a setting register associated with an ONU 130 with a longest silent history (e.g., not transmitting an upstream burst transmission for the longest time) is allocate to the new ONU 130. In other words, in some implementations, an ONU 130, that is silent for a longest time, is deactivated by the TC-MAC module 114 and the TC-MAC module 114 allocates the setting register associated the silent ONU 130 to a new ONU 130.

The method, at operation 504, includes detecting, by the TC-MAC module 114, a message (serial number, unique number) from a new ONU 130 in the PON during a (periodic) quiet window. In some implementations, to recognize or active a new ONU 130 added to the PON, a quiet window is scheduled. During the quiet window, none of the activated ONUs 130 is allowed to transmit the upstream burst transmissions to the OLT 110. In some implementations, the new ONU 130 is configured to transmit messages (a serial number in this example) to the OLT 110 randomly and/or periodically before being fully integrated into the PON (e.g., not yet activated). Since the new ONU 130 does not know about the arrangement of the quite window in the new PON, the new ONU 130 eventually transmits its serial number during the quiet windows and the serial number of the new ONU 130 is detected by the TC-MAC module 114.

The method, at operation 506, includes associating, by the TC-MAC module 114, the allocated setting register with the new ONU 130. In some implementations, the TC-MAC module 114 stores the serial number of the new ONU 130 to the allocated setting register. As a result, the new ONU 130 is activated.

In some implementations, when two or more messages are received in a sequential order (without overlapping) within one quite window, the TC-MAC module 114 is configured to perform additional operations (e.g., allocating and the associating described above) to active all the new ONU 130. In some implementations, when two or more messages are received at the same time (i.e., collision) within the quite window (which mean multiple new ONUs 130 are trying to be added to the PON), the TC-MAC module 114 is configured to discard the collided messages. In such instances, the two or more new ONUs 130 may attempt to retransmit their associated serial numbers in one or more subsequent quiet windows.

Figure 6:
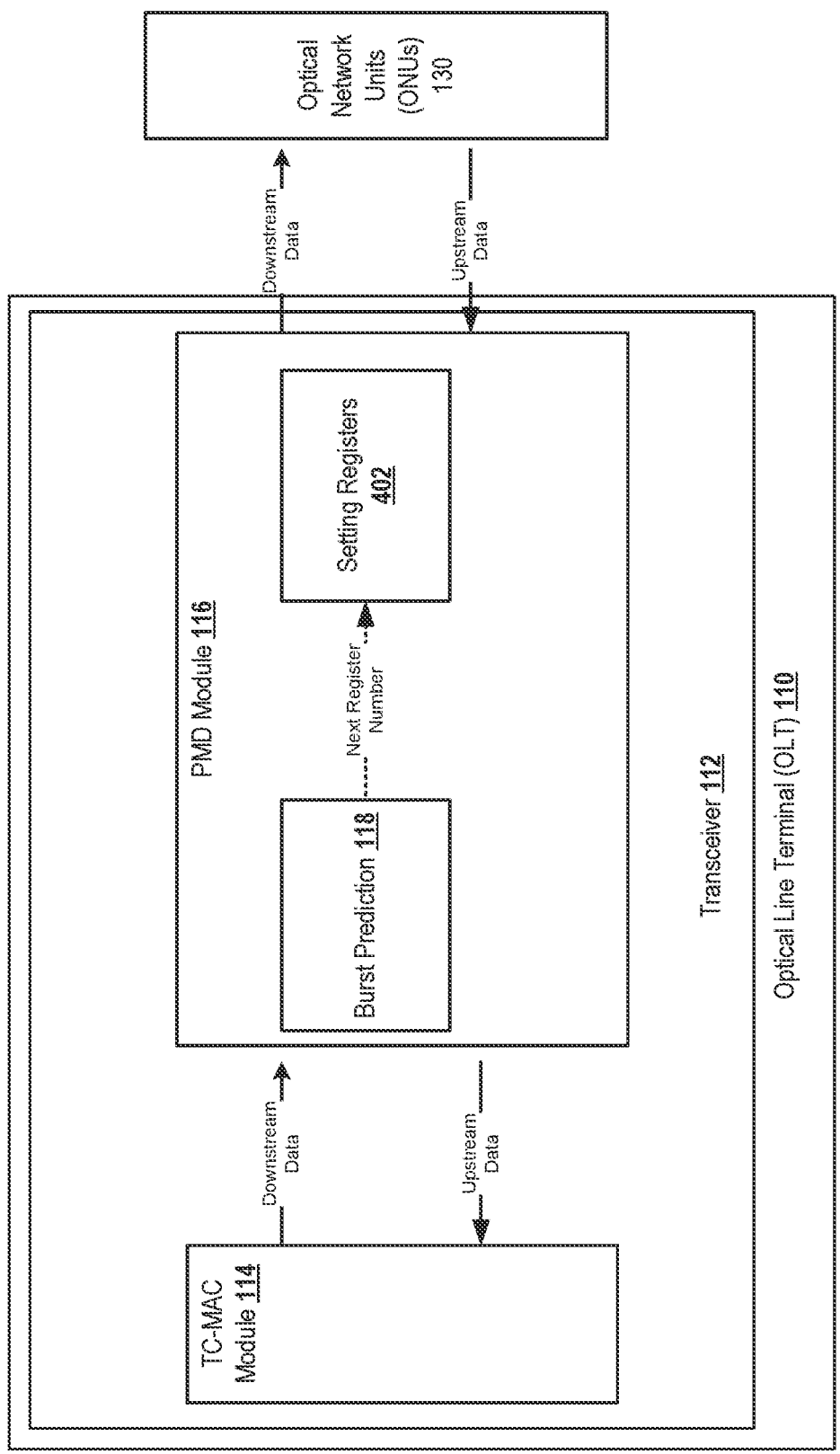
FIG. 6 illustrates an example transceiver (of an OLT) including a PMD module and a TC-MAC module in communication with the PMD module in accordance with some implementations of this disclosure.
Figure 7:
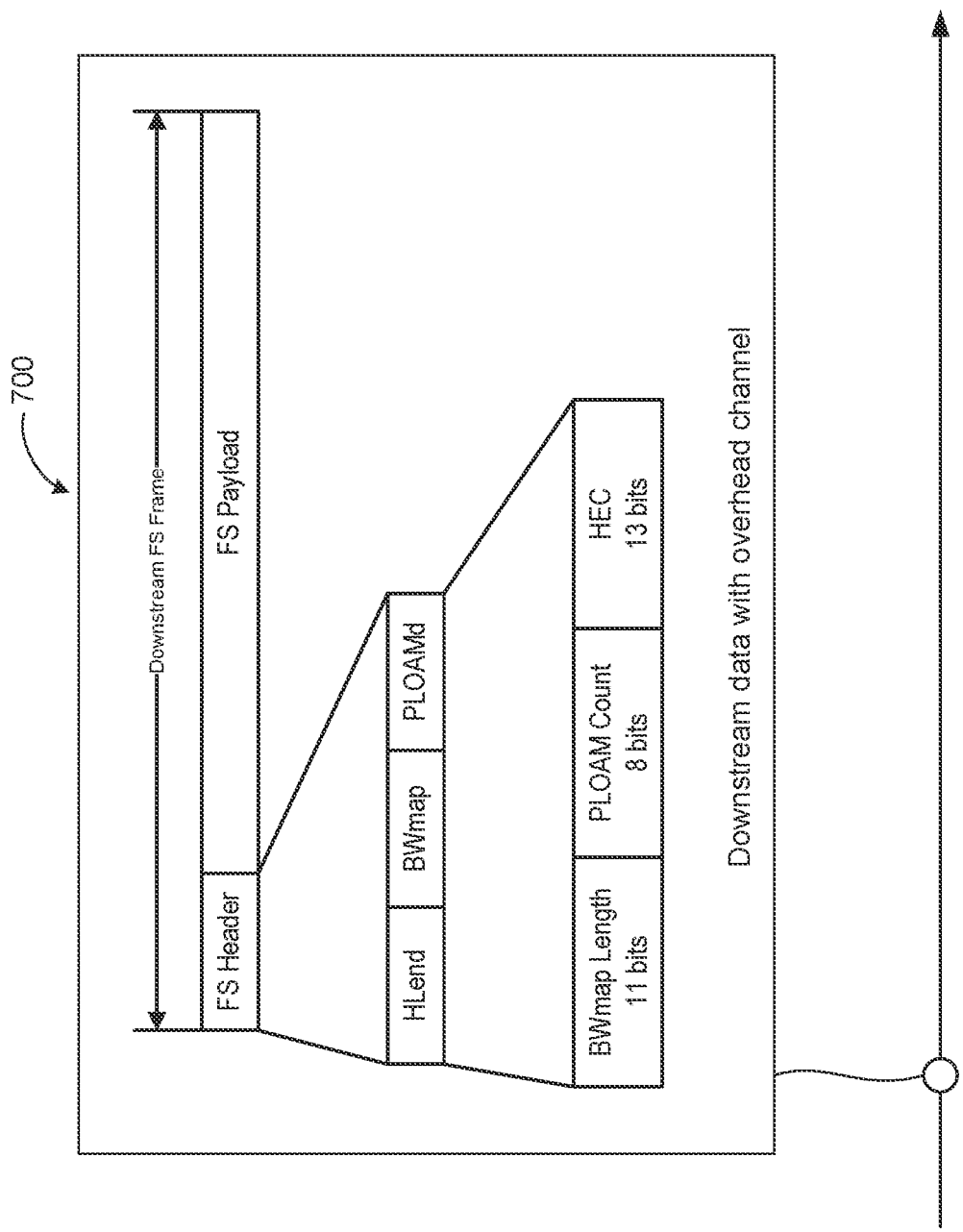
FIG. 7 illustrates an example framing sublayer (FS) frame in a PON.

FIG. 6 illustrates an example transceiver 112 (of an OLT 110) including a PMD module 116 and a TC-MAC module 114 in communication with the PMD module 116 in accordance with some implementations of this disclosure. FIG. 7 illustrates an example FS frame in a PON.

In some implementations, a burst prediction component 118 (in the PMD module 116) is configured to predict (or to keep track of) a next upstream burst transmission from any ONUs 130 included in the PON 100 (e.g., keeping track of next upstream burst transmission time, next upstream burst transmission length, and/or ONU transmitting the next upstream burst transmission) independent of the TC-MAC module 114.

In some implementations, the burst prediction component 118 is configured to monitor downstream data 700 (shown in FIG. 7) with overhead channel (e.g., control channel). For example, the downstream data 700 with overhead channel (e.g., control channel) may be embedded in the downstream data channel. In an example where the PON is an International Telecommunication Union (ITU) PON (which may include any of XG-PON, NG-PON2, XGS-PON, G.HSP), the downstream data 700 with overhead channel (e.g., control channel) may include a FS header, which including the information about the next upstream burst transmissions. As shown in FIG. 7, in some implementations, the FS header includes a bandwidth map (BWmap) and a physical layer operations management maintenance, downstream (PLOAMd).

In some implementations, the burst prediction component 118 is configured to determine which ONU 130 in the PON transmitting a next upstream burst transmission using an allocation identifier (AllocID) (in the FS layer) associated with the ONU 130. In some implementations, the communication between the TC-MAC module 114 and the PMD module 116 is configured to provide tolerance against transmission errors. In some implementations, the PMD module 116 (e.g., burst prediction component 118) is configured to obtain data transmission timing (e.g., a prediction of the upstream burst timing).

Figure 8:
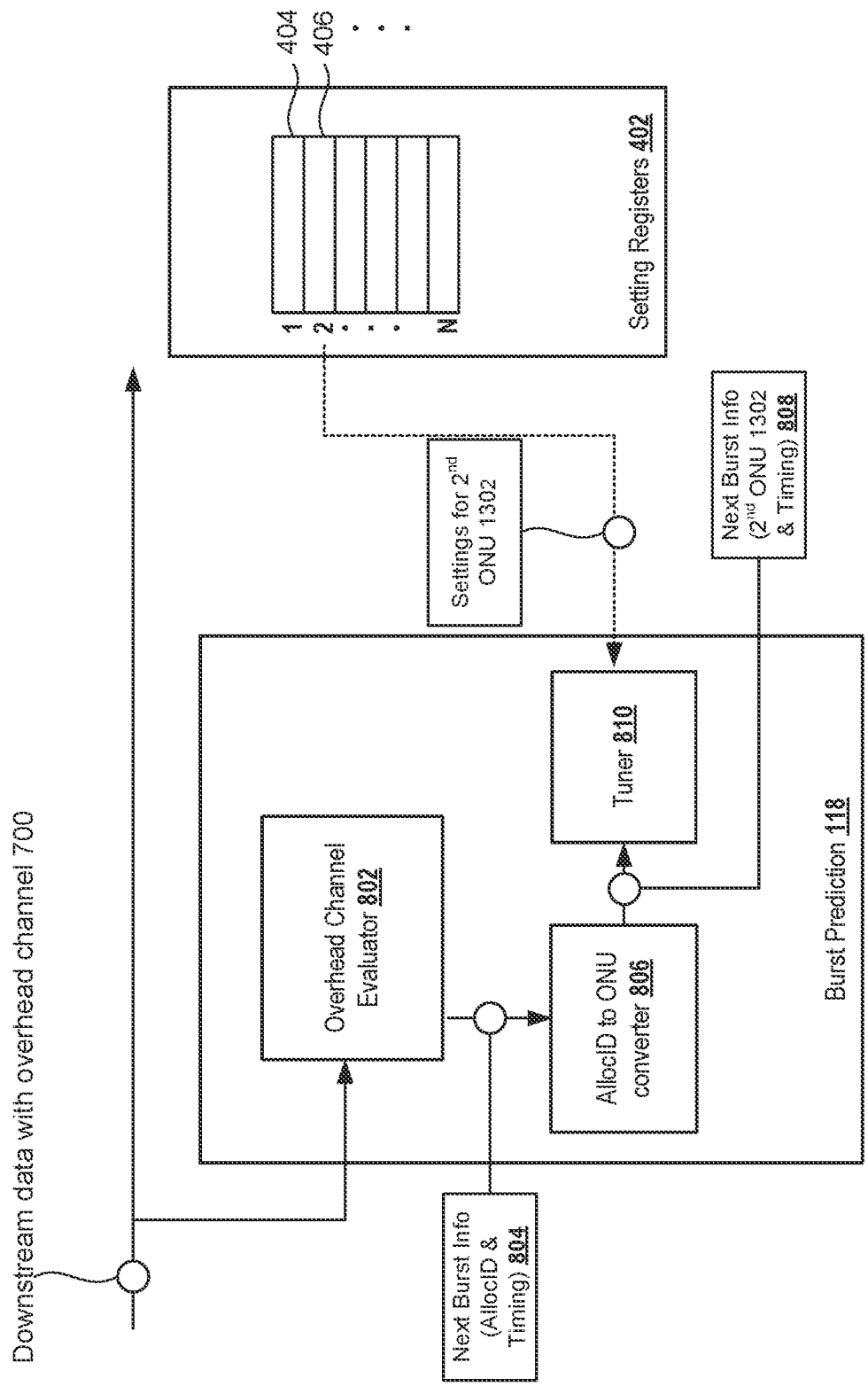
FIG. 8 illustrates an example burst prediction component of a PMD module in an OLT in accordance with some implementations of this disclosure.

FIG. 8 illustrates an example burst prediction component 118 of a PMD module 116 in an OLT 110) in accordance with some implementations of this disclosure.

As shown, in some implementations, the bust prediction component 118 includes an overhead channel evaluator 802, an allocation identifier (AllocID) to ONU converter 806, and a tuner 810.

In some implementations, the overhead channel evaluator 802 is configured to snoop or monitor the downstream data 700 with overhead channel to obtain information 804 of a next burst transmission (e.g., AllocID allocated with ONU transmitting the next burst transmission, start time, end time, length of the burst transmission, reset information) from the data in downstream overhead channel 700.

As discussed, the FS header included in the downstream data 700 with overhead channel from the OLT 110 to an ONU 130 includes information associated with an allocation identifier (AllocID) in bandwidth map (BWmap) field. For example, in the International Telecommunication Union (ITU) PON standard, the FS header may include information related to allocation identifiers (AllocIDs) and the FS header may not include (direct) information about ONUs 130.

As shown, in some implementations, the allocation identifier (AllocID) to ONU converter 806 is configured to associate an allocation identifier (AllocID) with an ONU 130 in the PON based on mapping performed by the PMD module 116 based on data in PLOAMd field.

In some implementations, the PMD module 116 is configured to determine the relation between an allocation identifier (AllocID) and an ONU 130 by monitoring the PLOAMd overhead channel. For example, the PLOAMd overhead channel may communicate the relationship between the allocation identifier (AllocID) and the ONU 130 to the PMD module 116. As a result, information 808 for the next burst transmission includes an ONU 130 corresponding to the allocation identifier (AllocID).

In some implementations, the turner 806 configured to receives the information 808 from the allocation identifier (AllocID) to ONU converter 806 is able to determine which setting register to use to adjust and/or tune settings within one or more components of the transceiver 112 (e.g., components/sub-components of the PMD module 116) which may place the OLT 110 in an improved condition (e.g., per-configured PMD module 116 so it is tuned and ready to work with an optical signal from the ONU 130 that transmits the next upstream burst transmission) to receive and process the upstream burst transmission. In this example, the allocation identifier (AllocID) to ONU converter 806 determines that the allocation identifier (AllocID) from the FS header is associated with the second ONU 130₂. Accordingly, the tuner 810 adjusts and/or tunes settings within one or more components of the transceiver 112 (e.g., components/subcomponents of the PMD module 116) based on settings stored in the second setting register 406.

In some implementation, the TC-MAC module 114 is configured to determine or identify a corresponding setting register (and/or ONU 130) for each allocation identifier (AllocID) and to communicate the setting register (and/or ONU 130) to allocation identifier (AllocID) information to the PMD module 116 over a control channel. For example, the TC-MAC module 114 may have access to the mapping between allocation identifier (AllocID) and ONU 130 (such as through activation, deactivation, and/or downstream transmissions) and the TC-MAC module 114 may transmit the allocation identifier (AllocID) and associated ONU 130 to the PMD module 116 over a dedicated control channel. In some implementations, the transmission of the allocation identifier (AllocID) and associated ONU 130 from the TC-MAC module 114 to the PMD module 116 may be performed at low speeds, such as speeds provided by a dedicated control channel. In some implementations, communication between the TC-MAC and the PMD is performed by (a) a dedicated control channel that is different from the data channel but may or may not be used for other control communication, or (b) an in-band channel in the data channel between PMD and TC-MAC.

In some implementations, the PMD module 116 is configured to determine the allocation identifier (AllocID) associated with an upstream burst using equalizer coefficients. In some implementations, the PMD module 116 is configured to train new coefficients based on received equalizer coefficients. The new coefficients may be compared to existing coefficients (such as stored in the setting registers 402) to determine whether the new allocation identifier (AllocID) is associated with an existing ONU 130. For example, the new coefficients may be compared against existing coefficients using a mean squared error calculation such as $$e = \frac{1}{N_{coefficients}} \sum_{n=1}^{N_{coefficients}} |C_{AllocIDa,n} - C_{AllocIDb,n}|^2.$$

In instances in which the error e is less than a threshold, the PMD module 116 may determine the new allocation identifier (AllocID) associated with the new coefficients belongs to an existing ONU 130 and one setting register may be used for the existing allocation identifiers (AllocIDs) and the new allocation identifier (AllocID). In some implementations, allocation identifiers (AllocIDs) with similar settings are mapped to the same ONU 130 using the same settings.

In some implementations, the PMD module 116 may be configured to determine the relation between an allocation identifier (AllocID) and an ONU 130 by monitoring the PLOAM overhead channel. For example, the PLOAM overhead channel may communicate the relationship between the allocation identifier (AllocID) and the ONU 130 to the PMD module 116.

In some implementations, the error correction of the PON is associated with a bandwidth map (BWmap) of a communication. In some implementations, an upstream burst includes the relationship between an ONU 130 and an allocation identifier (AllocID), such as an upstream burst over a PLOAM channel, may not include error correction coding. In some implementations, user data transmitted over the PLOAM channel may include error correction coding, such as low-density parity check (LDPC) or Reed-Solomon error correction coding.

In some implementations, transmission errors that may be present in control messages may be corrected by decoding the user data, such as by using low-density parity check (LDPC) or Reed-Solomon error correction on the user data in the control messages of the PLOAM channel. In some implementations, the decoding may be configured to operate at a lower data rate than the transmission rate. For example, the decoding may be configured to decode one or more codewords per downstream frame such that the bit error rate may be lower than the bit error rate at the ONU 130. In some implementations, the bit error rate at the ONU 130 may be reduced by reading control messages using a fault tolerant procedure for mapping ONUs 130 and associated allocation identifiers (AllocIDs). For example, an assign allocation identifier (AllocID) message may be repeated more than once by the OLT 110 and/or the PMD module 116 may be configured to perform operation based on repeated messages.

In some implementations, the PMD module 116 may be configured to derive a start time and a length of transmission for an upstream burst transmission. In some implementations, the PMD module 116 obtains the length of transmission from the bandwidth map (BWmap). In some implementations, the PMD module 116 is configured to determine the start time of an upstream burst from an upstream timing reference. For example, the timing reference may include a virtual start-of-upstream-frame, which may be expressed as a timing interval from a start of a first downstream frame to a start of a first upstream frame.

In some implementations, the TC-MAC module 114 is configured to obtain the timing reference. In instances in which the TC-MAC module 114 knows the timing reference, the TC-MAC module 114 may be configured to adjust the timing reference for each ONU 130 such that the timing references are equalized for each ONU 130 regardless of the physical length of fiber used in the transmission.

In some implementations, the PMD module 116 is configured to obtain the timing reference from the TC-MAC module 114. For example, the PMD module 116 may use a control channel to obtain the timing reference from the TC-MAC module 114. In some implementations, the timing reference data may be quasi-static information (e.g., not frequently changing in time) and may be communicated from the TC-MAC module 114 to the PMD module 116 using a low-speed management channel.

In some implementations, the PMD module 116 is configured to determine the transmitting ONU 130 using a measurement performed on the upstream burst upon the reception thereof. For example, the PMD module 116 may be configured to measure one or more signal characteristics, such as signal strength, that may contribute to determining an associated setting register for the upstream burst from the ONU 130. In some circumstances, different ONUs 130 may be mapped to the same setting register as the signal characteristics may be the same or similar. In such instances, a small penalty may be incurred in the PON.

In some implementations, the PMD module 116 is configured to determine the transmitting ONU 130 via a unique transmitted pattern at the beginning of the upstream burst. For example, the upstream burst may include a unique pattern that may be transmitted multiple times such that the unique pattern may be recovered by the PMD module 116 with or without a clock recovery. In some implementations, each bit of the unique pattern may be transmitted prior to training the phase locked loop (PLL), such that the transmit and receive clocks may not yet be aligned, which may be the reason behind multiple transmissions of the bits of the unique pattern. In some implementations, the unique pattern includes a unique identifier and/or a checksum. In some implementations, the TC-MAC module 114 is configured to assign the unique pattern used in the upstream burst preamble associated with each ONU 130 in the PON. In some implementations, the PMD module 116 is configured to obtain the pattern from the TC-MAC module 114. For example, the TC-MAC module 114 may transmit the pattern associated with an ONU 130 to the PMD module 116 over a low-speed communication channel, such as a configuration interface.

In some implementations, a receiver, such as the PMD module 116, in the PON is configured to obtain a received signal strength indicator (RSSI). In some implementations, the PMD module 116 is configured to determine the RSSI autonomously. For example, the PMD module 116 may be configured to determine the RSSI using information from ONUs 130, such as upstream burst transmit times. In some implementations, the PMD module 116 determines a length of an upstream burst and the associated ONU 130 using any of the preceding methods. In instances in which the upstream data burst is greater than a threshold length, such that the determined RSSI is determined to be accurate, the PMD module 116 is configured to store the determined RSSI value in the setting registers 402. In some implementations, each setting register may be configured to store equalizer coefficients, determined RSSI values, and/or other receiver settings. In some implementations, an associated TC-MAC module 114 may be configured to obtain the determined RSSI values from the setting register in the PMD module 116.

Figure 9:
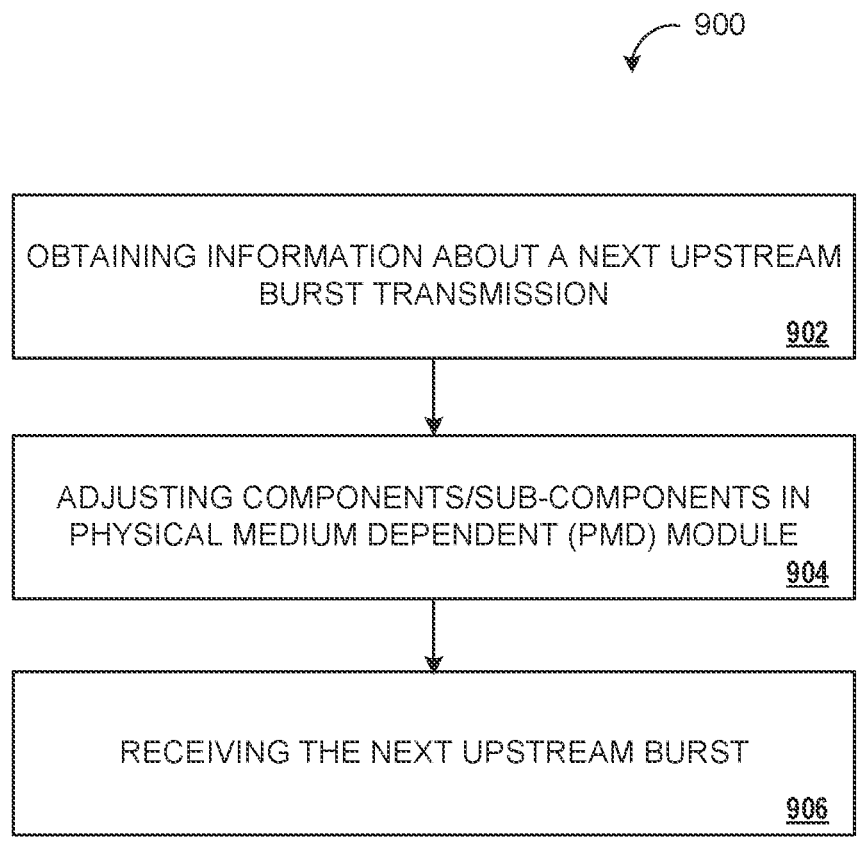
FIG. 9 is a flowchart of an example arrangement of operations for a method of adjusting components/sub-components in the transceiver of OLT (e.g., PMD module) in accordance with some implementations of this disclosure.

FIG. 9 is a flowchart of an example arrangement of operations for a method 900 of adjusting components/sub-components in the transceiver 112 of OLT 100 (e.g., PMD module 116) in accordance with some implementations of this disclosure.

The method 900 may be performed by processing logic that may include hardware (circuitry, dedicated logic, etc.), software (such as is run on a general purpose computer system or a dedicated machine), or a combination of both, which processing logic may be included in any computer system or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method, at operation 902, includes obtaining, at a PMD module 116, information with respect to the next upstream burst transmission (e.g., next upstream burst transmission time, next upstream burst transmission length, ONU transmitting the next upstream burst transmission). As discussed above, in some implementations, the information about the next upstream burst transmission is derived by a TC-MAC module 114. In some implementations, the information about the next upstream burst transmission is derived by the PMD module 116.

The method, at operation 902, includes adjusting, by the PMD module 116, with a set of settings (e.g., receiver settings and/or the adaptive settings) corresponding to the information (e.g., ONU transmitting the next upstream burst transmission). As discussed, in some implementations, based on the obtained information, the PMD module 116 is configured to adjust settings within one or more components of the transceiver 112 (e.g., components/sub-components of the PMD module 116) which may place the OLT 110 in an improved condition (e.g., per-configured PMD module 116 so it is tuned and ready to work with an optical signal from the ONU 130 that transmits the next upstream burst transmission) to receive and process the upstream burst transmission.

The method, at operation 904, includes receiving, by the PMD module 116, the next upstream burst transmission.

Figure 10:
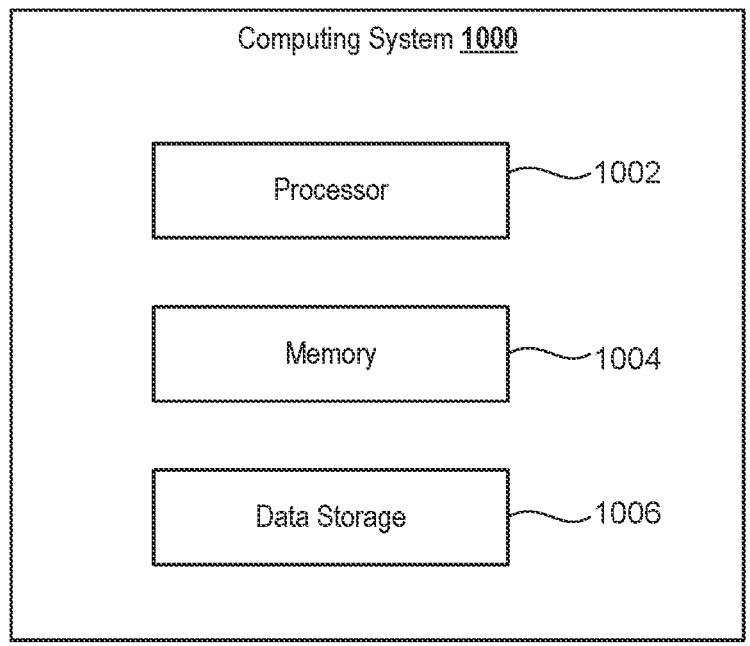
FIG. 10 illustrates a block diagram of an example computing system in accordance with some implementations of this disclosure.

FIG. 10 illustrates a block diagram of an example computing system 1000, according to some implementations of this disclosure. The computing system may be configured to implement or direct one or more operations associated with PMD module burst prediction. The computing system may include a processor 1002, a memory 1004, and a data storage 1006. The processor 1002, the memory 1004, and the data storage 1006 may be communicatively coupled.

In general, the processor 1002 may include any suitable special-purpose or general-purpose computer, computing entity, or processing device including various computer hardware or software modules and may be configured to execute instructions stored on any applicable computer-readable storage media. For example, the processor 1002 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 10, the processor 1002 may include any number of processors configured to, individually or collectively, perform or direct performance of any number of operations described in the present disclosure. Additionally, one or more of the processors may be present on one or more different electronic devices, such as different servers.

In some implementations, the processor 1002 may be configured to interpret and/or execute program instructions and/or process data stored in the memory 1004, the data storage, or the memory 1004 and the data storage. In some embodiments, the processor 1002 may fetch program instructions from the data storage 1006 and load the program instructions in the memory 1004. After the program instructions are loaded into memory 1004, the processor 1002 may execute the program instructions.

For example, in some implementations, the modification module may be included in the data storage 1006 as program instructions. The processor 1002 may fetch the program instructions of a corresponding module from the data storage 1006 and may load the program instructions of the corresponding module in the memory 1004. After the program instructions of the corresponding module are loaded into memory 1004, the processor 1002 may execute the program instructions such that the computing system may implement the operations associated with the corresponding module as directed by the instructions.

The memory 1004 and the data storage 1006 may include computer-readable storage media for carrying or having computer-executable instructions or data structures stored thereon. Such computer-readable storage media may include any available media that may be accessed by a general-purpose or special-purpose computer, such as the processor. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1002 to perform a certain operation or group of operations.

Modifications, additions, or omissions may be made to the computing system without departing from the scope of the present disclosure. For example, in some embodiments, the computing system may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method for receiving an upstream burst transmission, the method comprising:
   obtaining, by one or more processors, information about a next upstream burst transmission, wherein the information includes a start time of the next upstream burst transmission;
   determining, by the one or more processors, a set of settings based on the information; and
   adjusting, by the one or more processors, a physical medium dependent (PMD) module based on the set of settings prior to receiving the next upstream burst transmission by the PMD module.

2. The method of claim 1, wherein the PMD module is configured to derive the information about the next upstream burst transmission.

3. The method of claim 1, wherein a transmission control (TC-MAC) module in communication with the PMD module is configured to derive the information about the next upstream burst transmission.

4. The method of claim 1, wherein the information includes at least one of: a length of the next upstream burst transmission, an optical network unit (ONU) transmitting the next upstream burst transmission, an ending time of the next upstream burst transmission, or information related to performing a reset of settings.

5. The method of claim 4, wherein the set of settings includes at least one of: an equalizer coefficient associated with the ONU, a phase locked loop (PLL) setting associated with the ONU, an analog gain control (AGC) setting associated with the ONU, a direct current (DC) offset setting associated with the ONU, a symbol rate, or a data rate.

6. The method of claim 1, wherein obtaining the information includes:
   monitoring, by the one or more processors, downstream data; and
   analyzing, by the one or more processors, a framing sublayer (FS) frame in the downstream data.

7. The method of claim 6, the method further comprising:
   analyzing, by the one or more processors, first data in a bandwidth map field in the FS frame; and
   analyzing, by the one or more processors, second data in a physical layer operations management maintenance, downstream (PLOAMd) field in the FS frame.

8. The method of claim 7, wherein the first data in the bandwidth map field includes an allocation identifier (AllocID) associated with the next upstream burst transmission.

9. The method of claim 8, the method further comprising:
determining, by the one or more processors, an optical network unit (ONU) transmitting the next upstream burst transmission based on the allocation identifier (AllocID) in the first data and allocation identifier (AllocID)-to-ONU relationship information in the second data.

10. The method of claim 9, wherein the set of settings is associated with the ONU.

11. The method of claim 1, the method further comprising:
allocating a setting register for a new ONU;
detecting a message from the new ONU during a quiet window; and
associating the allocated setting register with the new ONU.

12. The method of claim 11, wherein the message includes a serial number of the new ONU.

13. The method of claim 1, wherein obtaining the information includes:
obtaining the information from a transmission control (TC-MAC) module in communication with the PMD module.

14. A system comprising:
data processing hardware; and
memory hardware in communication with the data processing hardware, the memory hardware storing instructions that when executed on the data processing hardware cause the data processing hardware to perform operations comprising:
obtaining information about a next upstream burst transmission, wherein the information includes a start time of the next upstream burst transmission;
determining a set of settings based on the information; and
adjusting a physical medium dependent (PMD) module based on the set of settings prior to receiving the next upstream burst transmission by the PMD module.

15. The system of claim 14, wherein the PMD module is configured to derive the information about the next upstream burst transmission.

16. The system of claim 14, wherein a transmission control (TC-MAC) module in communication with the PMD module is configured to derive the information about the next upstream burst transmission.

17. The system of claim 14, wherein the information includes at least one of: a length of then next upstream burst transmission, or an optical network unit (ONU) transmitting the next upstream burst transmission.

18. The system of claim 17, wherein the set of settings includes at least one of: an equalizer coefficient associated with the ONU, a phase locked loop (PLL) setting associated with the ONU, an analog gain control (AGC) setting associated with the ONU, a direct current (DC) offset setting associated with the ONU, a symbol rate, or a data rate.

19. The system of claim 14, wherein obtaining the information includes:
monitoring downstream data; and
analyzing a framing sublayer (FS) frame in the downstream data.

20. The system of claim 19, the operations further comprising:
analyzing first data in a bandwidth map field in the FS frame; and
analyzing second data in a physical layer operations management maintenance, downstream (PLOAMd) field in the FS frame.

21. The system of claim 20, wherein the first data in the bandwidth map field includes an allocation identifier (AllocID) associated with the next upstream burst transmission.

22. The system of claim 21, the operations further comprising:
determining an ONU transmitting the next upstream burst transmission based on the allocation identifier (AllocID) in the first data and allocation identifier (AllocID)-to-ONU relationship information in the second data.

23. The system of claim 22, wherein the set of settings is associated with the ONU.

24. The system of claim 14, the operations further comprising:
allocating a setting register for a new ONU;
detecting a message from the new ONU during a quiet window; and
associating the allocated setting register with the new ONU.

25. The system of claim 24, wherein the message includes a serial number of the new ONU.

26. The system of claim 14, wherein obtaining the information includes: obtaining the information from a transmission control (TC-MAC) module in communication with the PMD module.

* * * * *